United States Patent
Bala et al.

(10) Patent No.: US 9,639,768 B2
(45) Date of Patent: May 2, 2017

(54) METHODS AND SYSTEMS TO ADAPTIVELY DETECT OBJECT BORDERS FROM ELECTRONIC DEVICE IMAGES

(71) Applicant: Xerox Corporation, Norwalk, CT (US)

(72) Inventors: Raja Bala, Pittsford, NY (US); Lina Fu, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 181 days.

(21) Appl. No.: 14/564,546

(22) Filed: Dec. 9, 2014

(65) Prior Publication Data
US 2016/0163061 A1  Jun. 9, 2016

(51) Int. Cl.
G06K 9/32 (2006.01)
G06K 9/00 (2006.01)
G06K 9/03 (2006.01)

(52) U.S. Cl.
CPC ......... *G06K 9/325* (2013.01); *G06K 9/00442* (2013.01); *G06K 9/033* (2013.01)

(58) Field of Classification Search
None
See application file for complete search history.

(56) References Cited

U.S. PATENT DOCUMENTS

| | | |
|---|---|---|
| 5,491,759 A | 2/1996 | Nagao et al. |
| 6,005,683 A | 12/1999 | Son et al. |
| 6,922,487 B2 | 7/2005 | Dance et al. |
| 7,016,536 B1 | 3/2006 | Ling et al. |
| 7,760,908 B2 * | 7/2010 | Curtner ............... G06F 17/3079 348/143 |
| 8,331,685 B2 * | 12/2012 | Pettigrew ............. G06T 7/0085 345/619 |
| 2006/0033967 A1 * | 2/2006 | Brunner ............. G06K 9/00469 358/474 |
| 2006/0227997 A1 * | 10/2006 | Au ...................... G06K 9/00771 382/103 |
| 2007/0139722 A1 * | 6/2007 | Jordan ................. G06K 9/2054 358/448 |

(Continued)

OTHER PUBLICATIONS

Hartley, Richard I., "Self-Calibration from Multiple Views with a Rotating Camera", Computer Vision-ECCV'94. Springer Berlin Heidelberg, 1994, pp. 471-478.

(Continued)

*Primary Examiner* — Tsung-Yin Tsai
(74) *Attorney, Agent, or Firm* — Fox Rothschild LLP

(57) ABSTRACT

A method of automatically identifying a border in a captured image may include capturing an image of a target by an image sensor of an electronic device, and, by one or more processors, processing the image to automatically detect a border of the target in the image by applying an automatic border detection method to the image. The method may include presenting the image of the target to a user via a display of the electronic device so that the presented image comprises a visual depiction of the detected border, receiving an adjustment of the border from the user, determining whether to update the default parameters based on the received adjustment, in response to determining to update the default parameters, determining one or more updated parameters for the automatic border detection method that are based on, at least in part, the received adjustment, and saving the updated parameters.

18 Claims, 10 Drawing Sheets

(56) References Cited

U.S. PATENT DOCUMENTS

| | | | |
|---|---|---|---|
| 2011/0151837 A1* | 6/2011 | Winbush, III | H04W 8/22 455/412.1 |
| 2012/0051658 A1* | 3/2012 | Tong | G11B 27/034 382/224 |
| 2012/0249554 A1 | 10/2012 | Chen et al. | |
| 2013/0022231 A1* | 1/2013 | Nepomniachtchi | G06Q 20/042 382/102 |
| 2013/0085935 A1* | 4/2013 | Nepomniachtchi | G06Q 20/322 705/40 |
| 2014/0152849 A1 | 6/2014 | Bala et al. | |
| 2015/0049948 A1 | 2/2015 | Bala | |
| 2015/0054975 A1* | 2/2015 | Emmett | H04N 5/23245 348/220.1 |

OTHER PUBLICATIONS

Berdugo et al., "Object Reidentification in Real World Scenarios Across Multiple Non-Overlapping Cameras", 18th European Signal Processing Conference (EUSIPCO-2010) Aalborg, Denmark, Aug. 23-27, 2010.

* cited by examiner

FIG 6

METHODS AND SYSTEMS TO ADAPTIVELY DETECT OBJECT BORDERS FROM ELECTRONIC DEVICE IMAGES

BACKGROUND

Business Document Automation (BDA) allows users to streamline their documents and business processes through the use of applications, solutions, and services. BDA utilizes an "on-ramp" capability that allows users to scan printed documents into various electronic forms, thus bridging the gap between printed and electronic media. The use of mobile devices, such as, for example, smartphones and tablets, for document on-ramp is an important element in this strategy.

Automatic page border detection is an essential element of BDA that can significantly enhance ease of use. Accurate border detection saves a user time and effort to define the page/object borders, so that the unwanted background can be eliminated and the geometry correction of the document can be performed precisely. Also, reliable page border detection is important to ensure the output image exhibits low distortion and good resolution throughout the page.

Known algorithms for automatic border detection are typically not accurate when an image background includes clutter, edges or structure, or if there is not sufficient contrast between the document and the background.

SUMMARY

In an embodiment, a method of automatically identifying a border in a captured image may include capturing an image of a target by an image sensor of an electronic device. The method may include, by one or more processors, processing the image to automatically detect a border of the target in the image by applying an automatic border detection method to the image. The automatic border detection method may use one or more default parameters. The method may include presenting the image of the target to a user via a display of the electronic device so that the presented image comprises a visual depiction of the detected border, receiving, via a user interface, an adjustment of the border from the user, determining whether to update the default parameters based on the received adjustment, in response to determining to update the default parameters, determining one or more updated parameters for the automatic border detection method that are based on, at least in part, the received adjustment, and saving the updated parameters.

In an embodiment, a system of automatically identifying a border in a captured image may include an electronic device comprising an image sensor, and a computer-readable storage medium in communication with the electronic device. The computer-readable storage medium may include one or more programming instructions that, when executed, cause the electronic device to capture, by the image sensor, an image of a target, and process the image to automatically detect a border of the target in the image by applying an automatic border detection method to the image. The automatic border detection method may use one or more default parameters. The computer-readable storage medium may include one or more programming instructions that, when executed, cause the electronic device to present the image of the target to a user via a display of the electronic device so that the presented image comprises a visual depiction of the detected border, receive, via a user interface, an adjustment of the border from the user, determine whether to update the default parameters based on the received adjustment, in response to determining to update the default parameters, determine one or more updated parameters for the automatic border detection method that are based on, at least in part, the received adjustment, and save the updated parameters.

BRIEF DESCRIPTION OF THE DRAWINGS

FIGS. 5A, 5B and 6 illustrate example borders according to various embodiments.

DETAILED DESCRIPTION

Figure 1:
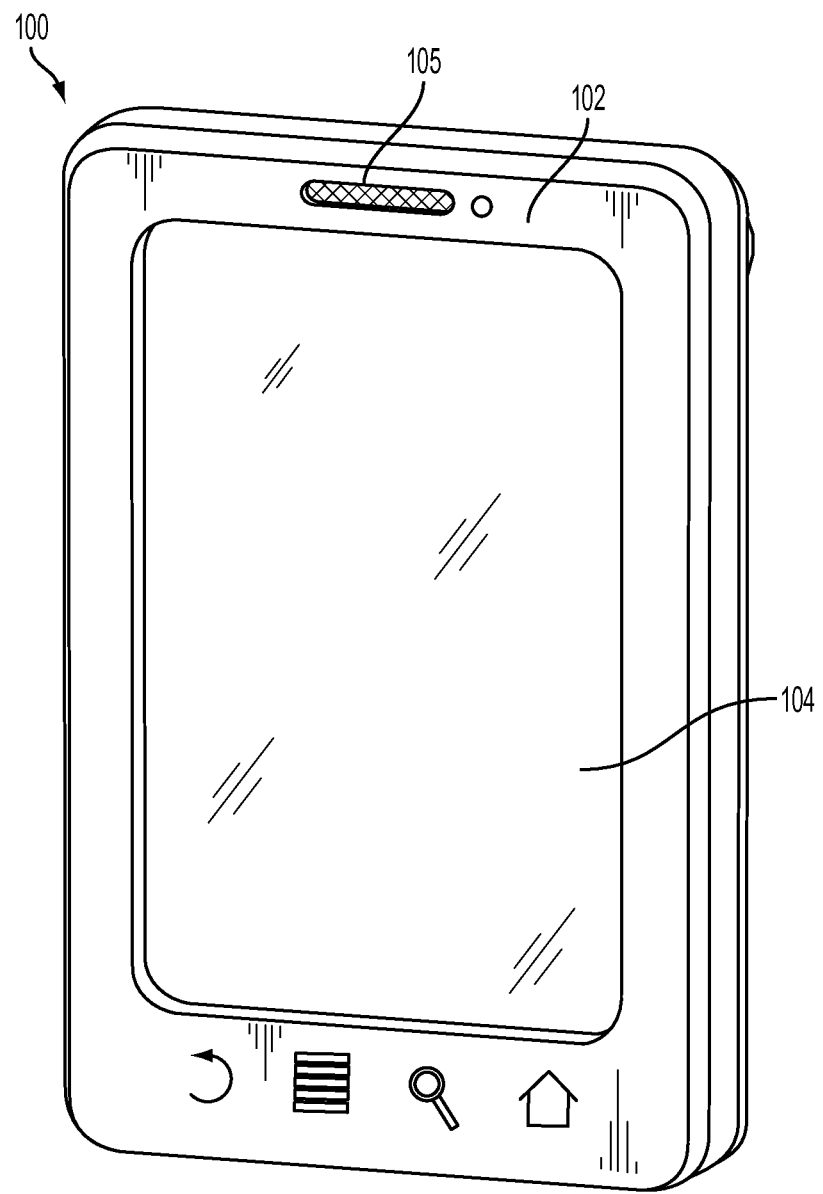
FIG. 1 illustrates an example mobile electronic device according to an embodiment.

For purposes of this document, the following terms shall have the following meanings:

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

A "computing device" or "electronic device" refers to a device that includes a processor and non-transitory, computer-readable memory. The memory may contain programming instructions that, when executed by the processor, cause the computing device or electronic device to perform one or more operations according to the programming instructions. As used in this description, a "computing device" or an "electronic device" may be a single device, or any number of devices having one or more processors that communicate with each other and share data and/or instructions. Unless the context specifically dictates otherwise, the term "processor" will include embodiments having a single processor, as well as embodiments in which multiple processors collectively perform various steps of a process. Examples of computing devices and/or electronic devices include personal computers, servers, mainframes, gaming systems, televisions, and portable electronic devices such as smartphones, personal digital assistants, cameras, tablet computers, laptop computers, media players and the like.

A "target" refers to a physical medium having a generally rectangular shape. Example targets may include, without limitation, a word processing document, a PDF document, a page of a document, a printed electronic message, a spreadsheet, an image, a picture, a presentation, a sign, a check, a business card, a form, a poster, a whiteboard and/or the like. In certain embodiments, a target may include content such as, for example, printed content, written content, images and/or the like. In other embodiments, a target may not include content.

The current disclosure is generally related to methods and systems of providing auto-crop functionality that dynamically learns from previous interactive corrections provided by a user. The functionality may adapt the border detection method and parameters for improved performance in future image capture sessions. Use of the described auto-crop function may improve the overall success rate of border detection operations and minimize manual intervention.

In many situations, users scan multi-page, multi-image or multi-element targets within a mobile scan session. In instances when the automatic border detection is inaccurate, the user is likely to manually correct the page corners, borders and/or the like. Using the information from the user's correction, the disclosed methods and systems search parameter space to find the parameters that yield a border that most closely matches the user defined border for the image just processed. The same parameters may then be used to detect one or more borders in one or more subsequent images, such as, for example, those obtained in the same session. Whenever a user corrects one or more of the auto-detected borders, one or more parameters may be re-adjusted.

FIG. 1 illustrates one example of a mobile electronic device, generally designated 100, that may be used to implement one or more processes described in this disclosure. The mobile electronic device 100 may include a front face 102 and a display 104. The display 104 may be any suitable component for displaying images, such as, but not limited to, electroluminescent displays, electronic paper displays, vacuum fluorescent displays, light emitting diode (LED) displays, cathode ray tube (CRT) displays, liquid crystal (LCD) displays, plasma display panels, digital light processing (DLP) displays, and organic light-emitting diode (OLED) displays. The display 104 may further include a touch sensitive screen, such as, but not limited to, resistive touchscreens, capacitive touchscreens, and infrared touchscreens.

Figure 2:
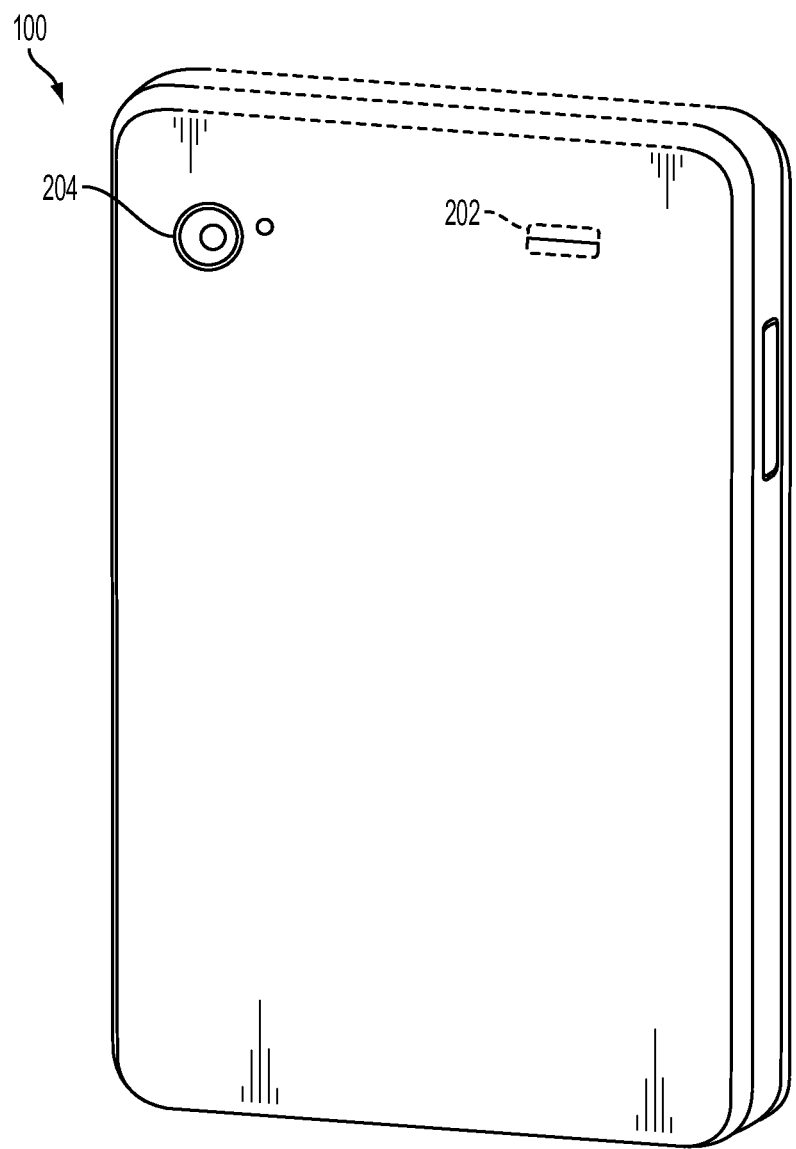
FIG. 2 shows an example rear face of a mobile electronic device according to an embodiment.

FIG. 2 shows a rear face 202 of the mobile electronic device 100. The rear face 202 may include an image capture device 204. The image capture device 204 may be any suitable component capable of receiving an optical image and transmitting the information to other components for processing.

While the image capture device 204 is depicted on the rear face of the present example, persons skilled in the art will appreciate that the imaging device 204 may be positioned at any location upon any face of the mobile device 100, or it may even be external to the mobile device 100 and connected by any means of electronic communication, such as, but not limited to, physical cable communication such as universal serial bus (USB), wireless radio communication, wireless light communication, or near field communication technology.

In some embodiments, the display 104 may be positioned within the mobile device 100, and it may be configured in such a way so as to display the output of the imaging device 204 in real time so that the user may view the display 104 and see the output of the imaging device 204 on the display. The display 104 is one type of user interface that the device may include. The device may include other types of user interfaces such as an audio output 105, such as a speaker or audio port.

Accordingly, the configuration of the mobile device 100 as shown in FIGS. 1 and 2 is only an example, and persons skilled in the art will appreciate that other configurations are able to achieve a similar overall result. The image capture and display process described above may be many other electronic devices having an image sensor and a display. The electronic device may also include internal hardware for implementing programming instructions, such as a memory containing such instructions, along with one or more processors that executed the instructions. As used in this document, unless the context specifically indicates otherwise, the word "processor" may refer to a single processor or a number of processors that together implement a process.

Figure 3:
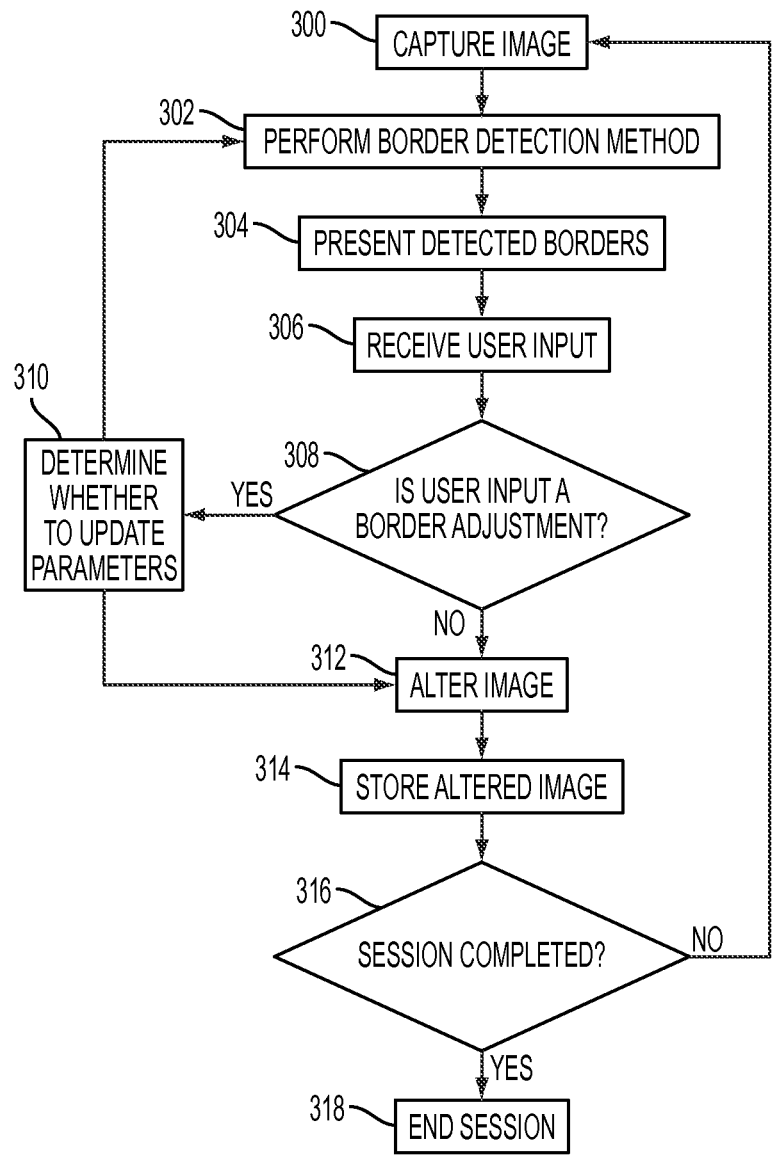
FIG. 3 illustrates an example method of detecting an object border according to an embodiment.

FIG. 3 illustrates an example method of detecting an object border according to an embodiment. As illustrated by FIG. 3, an electronic device may capture 300 an image of a target. In various embodiments, an electronic device may capture 300 an image of a target via an image capture device such as a camera or other image sensor that captures the image and saves image data to an image file.

The electronic device may execute programming instructions that cause a processor of the device to analyze the image by performing 302 an automatic border detection method on the captured image to determine a border associated with the target in the captured image. Example automatic border detection methods may include, without limitation, algorithms built on top of line features from the Marr-Hildreth edge detector, the Canny edge detector, other line detection algorithms and/or the like. In certain embodiments, an automatic border detection method, such as those above, may identify one or more parameters of the image such as, for example, color space, edge detection parameters, line detection parameters, image rescaling factor, border length, border width, border location or placement, corner location or placement, and/or the like, and use the parameters to determine a border associated with a target. The one or more parameters that are used to perform 302 an automatic border detection method may be referred to in this disclosure as default parameters at the start of the of a border detection process. In some parts of the process, these parameters may be referred to as updated parameters.

Figure 4A:
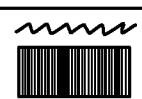
FIGS. 4A and 4B illustrate example images according to various embodiments.
Figure 4B:

FIGS. 4A and 4B illustrate two images of example bank application forms that may be captured by an electronic device during the same session according to an embodiment. By default, one or more of the images may be converted to grayscale or luminance for border detection. However, there may be instances when edges with low lightness contrast may not be identified in gray images, when they may be easily identified with the help of color information.

In various embodiments, returning to FIG. 3, an electronic device may present 304 the detected border to a user. For example, an electronic device may present the captured image of a document to a user via a display of the electronic device so that the presented image identifies the detected border. The border may be displayed as an overlay to the image, as part of the image and/or the like. In certain embodiments, the border may be illustrated using one or more lines such as, for example, solid lines, dotted lines, dashed lines or other representations. In an embodiment, one or more corners of a presented image may be identified or marked with circles or other markers or identifiers.

Figure 5A:
Figure 5B:
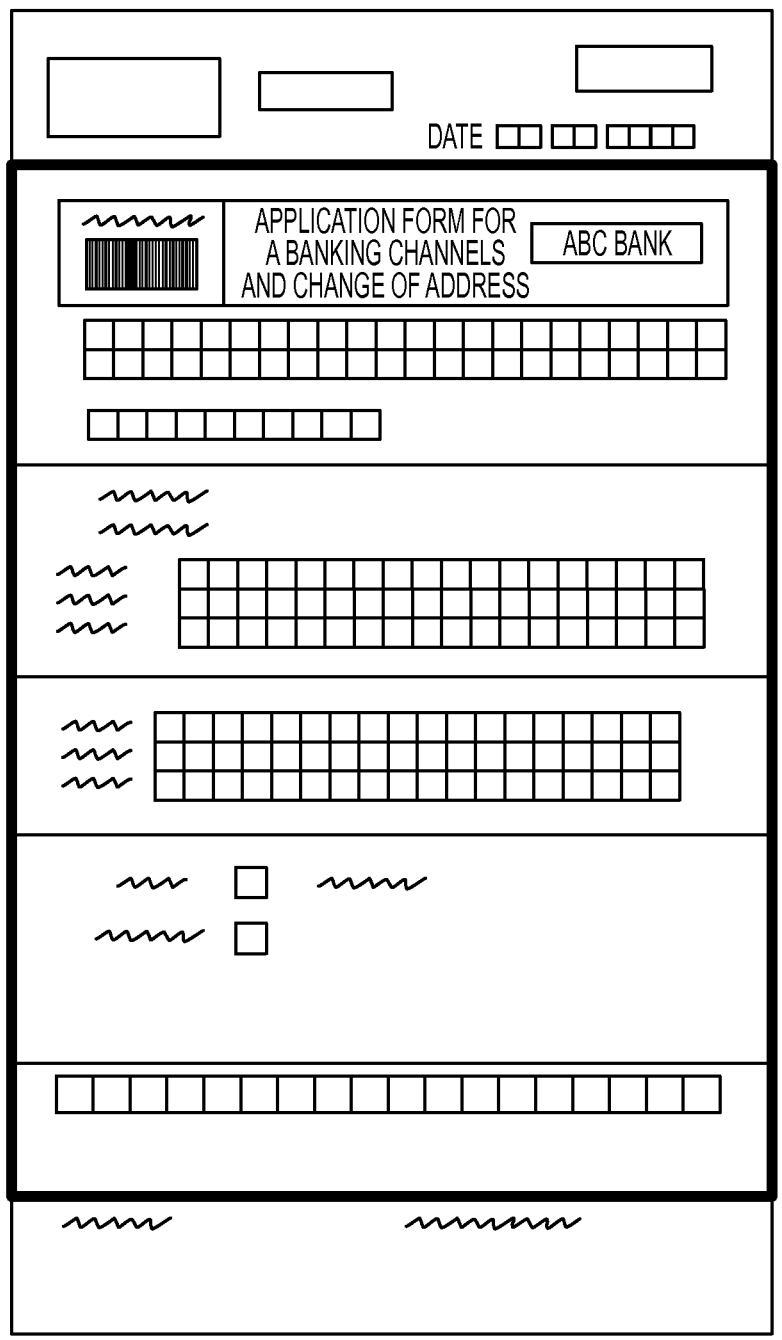

For example, FIG. 5A illustrates an example border corresponding to the image shown in FIG. 4A, while FIG. 5B illustrates an example border corresponding to the image shown in FIG. 4B. As illustrated by FIGS. 5A and 5B, the borders that are determined for the underlying images are incorrect. The borders may have been detected in default gray space, so the errors may have occurred due to poor contrast in the gray space.

In an embodiment, the electronic device may receive 306 user input in response to presenting 304 the detected border. In various embodiments, user input may include an indication that the user accepts the presented border. In another embodiment, user input may include an adjustment of the border from a user. For example, a user may change the location, the position and/or one or more dimensions of the border or its associated corners using a touch screen or other user interface of the electronic device. "User input" may also include the lack of an adjustment by the user within a threshold period of time.

An electronic device may determine 308 whether a received user input is an adjustment of the border. If so, the electronic device may determine 310 whether to update one or more updated parameters.

Figure 7:
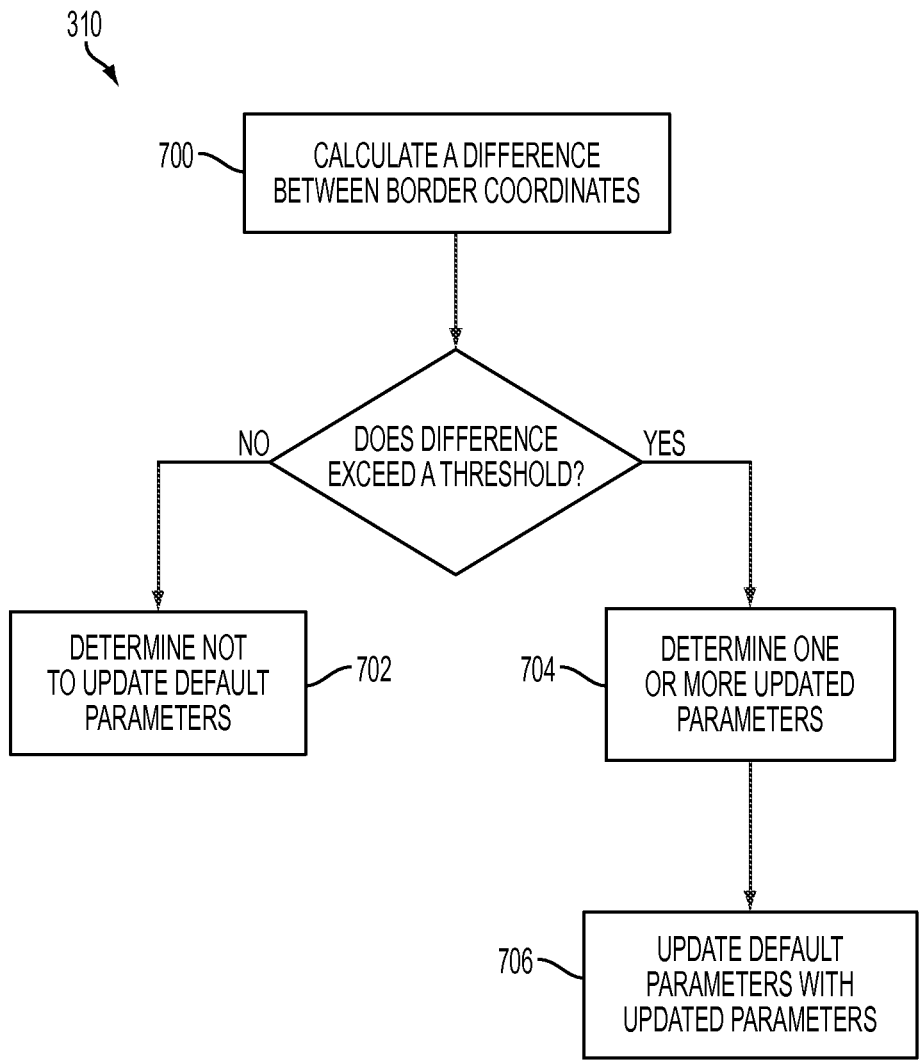
FIG. 7 illustrates an example method of determining whether to update one or more default parameters according to an embodiment.

FIG. 7 illustrates an example method of determining 310 whether to update one or more updated parameters according to an embodiment. As illustrated by FIG. 7, an electronic device may calculate 700 a difference between any of the border coordinates associated with the user-adjusted border and any of the border coordinates associated with the automatically detected border. If the determined difference for any coordinate is not greater than a threshold value, then an electronic device may determine 702 not to update one or more of the parameters associated with that coordinate.

If, however, the difference is greater than a threshold value, an electronic device may determine 704 one or more updated parameters. In an embodiment, an electronic device may determine 704 one or more updated parameters that minimize the difference between the border coordinates associated with the user-adjusted border and the automatically detected border. The electronic device may update 706 the default parameter set with the determined updated parameters. Accordingly, the next time the electronic device performs 302 automatic border detection, it may use the determined updated parameters to determine a border for a target. The device may repeat this process for any or all of the parameters that it uses in the automated border detection process.

Referring back to FIG. 3, an image may be altered 312. In an embodiment, when the border is confirmed, such as may occur if a user adjusts the border after it is presented, the electronic device may alter 312 the image by performing one or more operations, such as, for example, cropping or geometric correction, on a portion of the image that is within a user-adjusted border. Cropping may cause the image to have a border that corresponds to the adjusted border. In an embodiment, if the received user "input" is no adjustment of the presented border within a threshold time, the electronic device may alter 312 the image by performing one or more operations, such as, for example, cropping or geometric correction, on a portion of the image that is within a presented border associated with the default parameters. In various embodiments, the electronic device may present the altered image to a user and/or store 314 the altered image.

Figure 6:
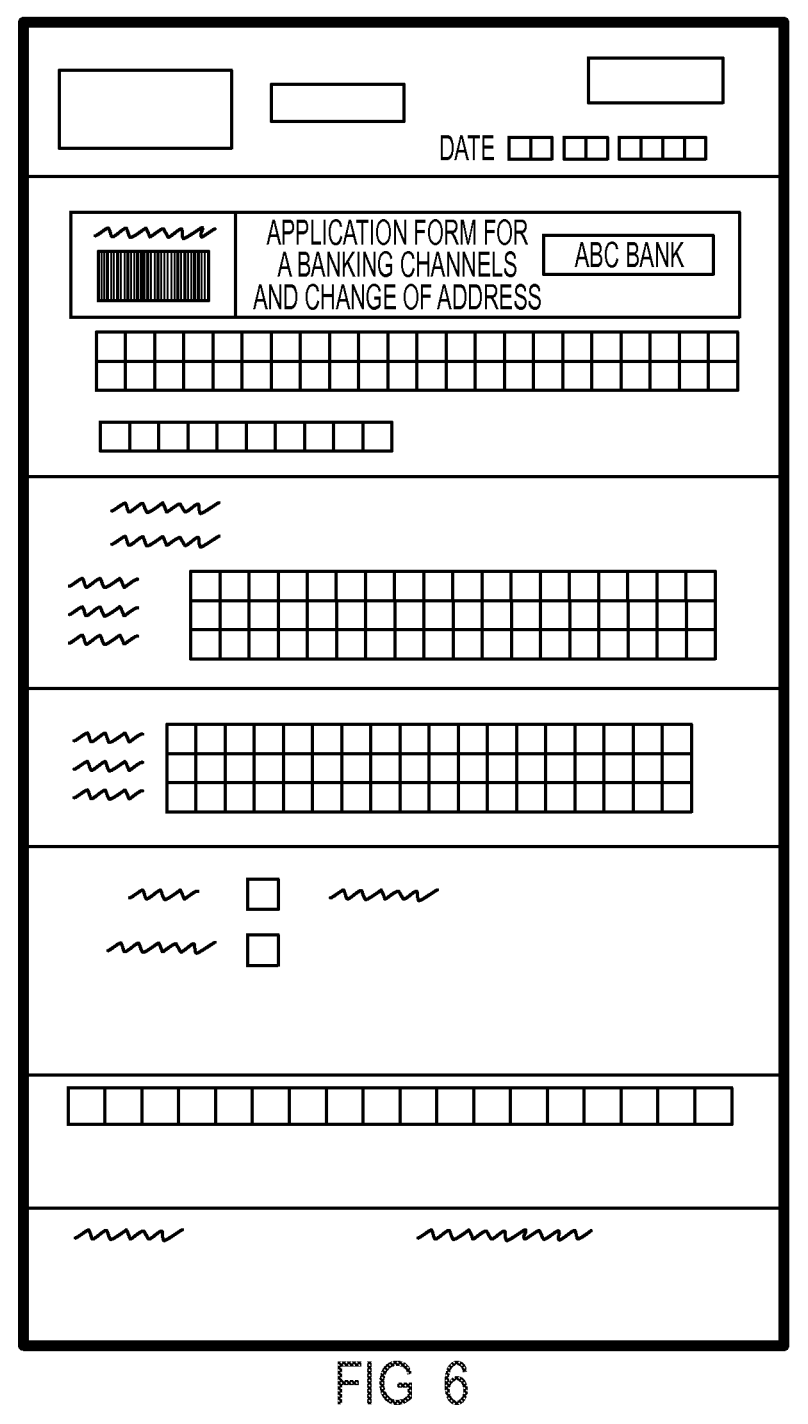

For example, FIG. 6 illustrates an image of an example border for the images illustrated in FIGS. 4A and 4B that may be determined using updated parameters from a user adjustment. As illustrated by FIG. 6, the border surrounds the entirety of the image, unlike the border illustrated in either FIG. 4A or FIG. 4B.

In an embodiment, returning again to FIG. 3, an electronic device may determine 316 whether a session is completed. An electronic device may determine 316 whether a session is completed by receiving an indication of session completion or other input from a user. Alternatively, an electronic device may determine 316 whether a session is completed by determining whether a certain time period has passed from the capture of the last image. If a threshold period of time has passed, an electronic device may determine 316 that the session is completed.

If an electronic device determines 316 that a session is completed, the session may be ended 318. If an electronic device determines 316 that a session is not completed, the process described above with respect to steps 300-314 may be repeated for a subsequently captured image. If updated parameters were received during the capture process of an immediately preceding image capture, those updated parameters may be considered the default parameters for the next image on which automatic border detection is performed in the same session. In an embodiment, updated parameters may be used to perform automatic border detection on one or more subsequently captured images during the same session until different updated parameters are determined. In various embodiments, a subsequent target may be the same target from a previously captured image, or it may be a different target.

In certain embodiments, an electronic device may determine whether a subsequent image was captured during the same session as a previously captured image. An electronic device may determine whether a subsequent image was captured during the same session as a previously captured image by determining one or more properties associated with the previously captured image and/or the subsequent image. An example property may include a duration of time between capture of the previously captured image and capture of the subsequent image. For instance, if the subsequent image is captured within a certain time period from the capture of the previously captured image, then the capture of the subsequent image may be determined to be within the same session as the capture of the previously captured image. Otherwise, the captures may be determined to have occurred during different sessions.

In an embodiment, the location of one or more captures may be an example property. For instance, if an electronic device determines that a previously captured image was captured from the same location as or a location in proximity to the location in which a subsequent image was captured, then the electronic device may determine that the previously captured and the subsequent image were captured during the same session. Otherwise, the electronic device may determine that the captures occurred during different sessions.

In an embodiment, a motion of a user of an electronic device used to capture one or more images may be an example property. For instance, if an accelerator or other motion of the device detects that the device has moved a certain distance, or at a certain speed, within a period of time, the device may conclude (or use this information as one factor to conclude) that the session must be complete because the user has moved the device away from the target.

Figure 8:
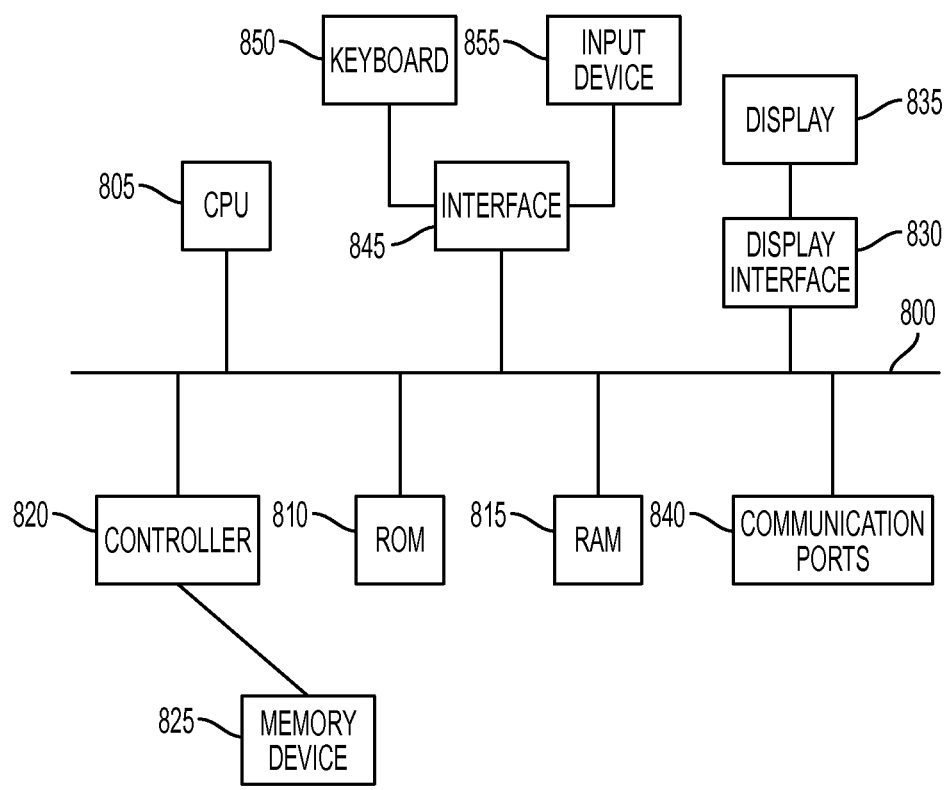
FIG. 8 illustrates a block diagram of example hardware that may be used to contain or implement program instructions according to an embodiment.

FIG. 8 depicts a block diagram of hardware that may be used to contain or implement program instructions. A bus 800 serves as the main information highway interconnecting the other illustrated components of the hardware. CPU 805 is the central processing unit of the system, performing calculations and logic operations required to execute a program. CPU 805, alone or in conjunction with one or more of the other elements disclosed in FIG. 8, is an example of an electronic device, computing device or processor as such terms are used within this disclosure. Read only memory (ROM) 810 and random access memory (RAM) 815 constitute examples of non-transitory computer-readable storage media.

A controller 820 interfaces with one or more optional non-transitory computer-readable storage media 825 to the system bus 800. These storage media 825 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 810 and/or the RAM 815. Optionally, the program instructions may be stored on a tangible, non-transitory computer-readable medium such as a compact disk, a digital disk, flash memory, a memory card, a USB drive, an optical disc storage medium and/or other recording medium.

An optional display interface 830 may permit information from the bus 800 to be displayed on the display 835 in audio, visual, graphic or alphanumeric format. Communication with external devices, such as a printing device, may occur using various communication ports 840. A communication port 840 may be attached to a communications network, such as the Internet or an intranet.

The hardware may also include an interface 845 which allows for receipt of data from input devices such as a keyboard 850 or other input device 855 such as a mouse, a joystick, a touch screen, a remote control, a pointing device, a video input device and/or an audio input device.

It will be appreciated that the various above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A method of automatically identifying a border in a captured image, the method comprising:
    by an image sensor of a mobile electronic device, capturing an image of a target;
    by one or more processors:
        processing the image to automatically detect a border of the target in the image by applying an automatic border detection method to the image, wherein the automatic border detection method uses one or more default parameters,
        presenting the image of the target to a user via a display of the mobile electronic device so that the presented image comprises a visual depiction of the detected border,
        receiving, via a user interface, an adjustment of the border from the user,
        determining whether to update the default parameters based on the received adjustment by:
            determining a difference between one or more border coordinates associated with the received adjustment and one or more border coordinates associated with the default parameters, and
            in response to the difference exceeding a threshold value:
                determining one or more updated parameters that minimize the difference, and
                replacing the default parameters with the updated parameters, and
                saving the updated parameters.

2. The method of claim 1, further comprising:
    altering at least a portion of the image that is within the user-adjusted border; and
    presenting the altered image to a user via the display of the mobile electronic device.

3. The method of claim 2, wherein altering at least a portion of the image that is within the user-adjusted border comprises performing one or more of the following operations on the portion:
    cropping; and
    geometric correction.

4. The method of claim 1, further comprising:
    in response to the difference not exceeding a threshold value, not updating the default parameters.

5. The method of claim 1, further comprising:
    receiving a subsequent image of a subsequent target;
    determining whether the subsequent image was received during a same session as the image; and
    in response to determining that the subsequent image was received during the same session as the image:
        processing the subsequent image to automatically determine a second border of the subsequent target in the image by applying the automatic border detection method to the image, wherein the automatic border detection method uses at least one or more of the updated parameters.

6. The method of claim 5, further comprising:
    presenting the subsequent image of the target to a user via the display of the mobile electronic device so that the presented subsequent image comprises a visual depiction of the second border,
    receiving, via the user interface, an adjustment of the second border from the user,
    altering at least a portion of the subsequent image that is within the second border, and
    presenting the altered subsequent image to a user via the display of the mobile electronic device.

7. The method of claim 5, wherein determining whether the subsequent image was received during a same session as the image comprises:
    determining whether the subsequent image is captured within a time period from a time that the image is captured and at a same location as the image was captured; and
    in response to determining that the subsequent image is received within the time period and at the same location, determining that the subsequent image is received in the same session.

8. The method of claim 1, further comprising:
    receiving a subsequent image of a subsequent target;
    determining whether the subsequent image was received during a same session as the image; and
    in response to determining that the subsequent image was not received during the same session as the image, processing the subsequent image to automatically determine a second border of the subsequent target in the subsequent image by applying the automatic border detection method to the subsequent image, wherein the automatic border detection method uses one or more of the default parameters.

9. The method of claim 8, further comprising:
    presenting the subsequent image of the target to a user via the display of the mobile electronic device so that the presented subsequent image comprises a visual depiction of the second border,
    receiving, via the user interface, an adjustment of the second border from the user,
    altering at least a portion of the subsequent image that is within the second border, and
    presenting the altered subsequent image to a user via the display of the mobile electronic device.

10. A system of automatically identifying a border in a captured image, the system comprising:
- a mobile electronic device comprising an image sensor; and
- a computer-readable storage medium in communication with the mobile electronic device, wherein the computer-readable storage medium comprises one or more programming instructions that, when executed, cause the mobile electronic device to:
  - capture, by the image sensor, an image of a target,
  - process the image to automatically detect a border of the target in the image by applying an automatic border detection method to the image, wherein the automatic border detection method uses one or more default parameters,
  - present the image of the target to a user via a display of the mobile electronic device so that the presented image comprises a visual depiction of the detected border,
  - receive, via a user interface, an adjustment of the border from the user,
  - determine whether to update the default parameters based on the received adjustment by:
    - determining a difference between one or more border coordinates associated with the received adjustment and one or more border coordinates associated with the default parameters, and
    - in response to the difference exceeding a threshold value:
      - determining one or more updated parameters that minimize the difference, and
      - replacing the default parameters with the updated parameters, and
  - save the updated parameters.

11. The system of claim 10, wherein the computer-readable storage medium further comprises one or more programming instructions that, when executed, cause the mobile electronic device to:
- alter at least a portion of the image that is within the user-adjusted border; and
- present the altered image to a user via the display of the mobile electronic device.

12. The system of claim 11, wherein the one or more programming instructions that, when executed, cause the mobile electronic device to alter at least a portion of the image that is within an updated border comprise one or more programming instructions that, when executed, cause the mobile electronic device to perform one or more of the following operations on the portion:
- cropping; and
- geometric correction.

13. The system of claim 10, wherein the computer-readable storage medium further comprises one or more programming instructions that, when executed, cause the mobile electronic device to:
- in response to the difference not exceeding a threshold value, not update the default parameters.

14. The system of claim 10, wherein the computer-readable storage medium further comprises one or more programming instructions that, when executed, cause the mobile electronic device to:
- receive a subsequent image of a subsequent target;
- determine whether the subsequent image was received during a same session as the image; and
- in response to determining that the subsequent image was received during the same session as the image:
  - process the subsequent image to automatically determine a second border of the subsequent target in the image by applying the automatic border detection method to the image, wherein the automatic border detection method uses at least one or more of the updated parameters.

15. The system of claim 14, wherein the computer-readable storage medium further comprises one or more programming instructions that, when executed, cause the mobile electronic device to:
- present the subsequent image of the target to a user via the display of the mobile electronic device so that the presented subsequent image comprises a visual depiction of the second border,
- receive, via the user interface, an adjustment of the second border from the user,
- alter at least a portion of the subsequent image that is within the second border, and
- present the altered subsequent image to a user via the display of the mobile electronic device.

16. The system of claim 14, wherein the one or more programming instructions that, when executed, cause the mobile electronic device to determine whether the subsequent image was received during a same session as the image comprise one or more programming instructions that, when executed, cause the mobile electronic device to:
- determine whether the subsequent image is captured within a time period from a time that the image is captured and at a same location as the image was captured; and
- in response to determining that the subsequent image is received within the time period and at the same location, determine that the subsequent image is received in the same session.

17. The system of claim 10, wherein the computer-readable storage medium further comprises one or more programming instructions that, when executed, cause the mobile electronic device to:
- receive a subsequent image of a subsequent target;
- determine whether the subsequent image was received during a same session as the image; and
- in response to determining that the subsequent image was not received during the same session as the image, process the subsequent image to automatically determine a second border of the subsequent target in the subsequent image by applying the automatic border detection method to the subsequent image, wherein the automatic border detection method uses one or more of the default parameters.

18. The system of claim 17, wherein the computer-readable storage medium further comprises one or more programming instructions that, when executed, cause the mobile electronic device to:
- present the subsequent image of the target to a user via the display of the mobile electronic device so that the presented subsequent image comprises a visual depiction of the second border,
- receive, via the user interface, an adjustment of the second border from the user,
- alter at least a portion of the subsequent image that is within the second border, and
- present the altered subsequent image to a user via the display of the mobile electronic device.

* * * * *